United States Patent
Neubauer

(10) Patent No.: US 7,452,319 B2
(45) Date of Patent: Nov. 18, 2008

(54) APPARATUS FOR PRODUCING DOUBLE-WALLED COMPOSITE TUBES

(75) Inventor: Gerhard Neubauer, Königsberg (DE)

(73) Assignee: Unicor GmbH (DE)

( * ) Notice: Subject to any disclaimer, the term of this patent is extended or adjusted under 35 U.S.C. 154(b) by 0 days.

(21) Appl. No.: 11/426,142

(22) Filed: Jun. 23, 2006

(65) Prior Publication Data
US 2006/0293159 A1 Dec. 28, 2006

(30) Foreign Application Priority Data
Jun. 25, 2005 (DE) ................. 10 2005 029 580

(51) Int. Cl.
B31C 13/00 (2006.01)
B29C 47/08 (2006.01)

(52) U.S. Cl. .................. 493/293; 493/269; 264/511; 425/325

(58) Field of Classification Search ............ 493/269, 493/293, 294, 302; 425/336, 325, 326.1, 425/133.1; 264/508, 511, 515
See application file for complete search history.

(56) References Cited

U.S. PATENT DOCUMENTS

| | | | | |
|---|---|---|---|---|
| 3,538,209 | A * | 11/1970 | Hegler | 264/508 |
| 4,226,580 | A * | 10/1980 | Lupke et al. | 425/504 |
| 4,500,284 | A * | 2/1985 | Lupke | 425/511 |
| 4,710,337 | A * | 12/1987 | Nordstrom | 264/508 |
| 4,808,098 | A | 2/1989 | Chan et al. | 425/72.1 |
| 4,846,660 | A * | 7/1989 | Drossbach | 425/503 |
| 4,865,797 | A * | 9/1989 | Jarvenkyla | 264/508 |
| 4,873,048 | A * | 10/1989 | Jarvenkyla | 264/504 |
| 4,936,768 | A * | 6/1990 | Lupke | 425/532 |
| 5,002,478 | A * | 3/1991 | Lupke | 425/325 |
| 5,023,029 | A * | 6/1991 | Lupke | 264/40.5 |
| 5,296,188 | A * | 3/1994 | Lupke | 264/508 |
| 5,320,797 | A * | 6/1994 | Hegler et al. | 264/511 |
| 5,405,569 | A * | 4/1995 | Lupke | 264/504 |
| 5,531,583 | A * | 7/1996 | Berns et al. | 425/193 |
| 6,257,866 | B1 * | 7/2001 | Fritz et al. | 425/387.1 |
| 6,458,311 | B1 * | 10/2002 | Hegler | 264/508 |
| 6,539,829 | B1 | 4/2003 | Kaupplia et al. | |
| 6,671,911 | B1 | 1/2004 | Hill et al. | |
| 7,214,051 | B2 * | 5/2007 | Lupke et al. | 425/336 |

FOREIGN PATENT DOCUMENTS

| | | |
|---|---|---|
| DE | 690 12 129 T2 | 2/1995 |
| DE | 102 25 582 A1 | 12/2003 |
| NL | 8 700 203 | 8/1988 |
| WO | WO90/14208 | 11/1990 |

* cited by examiner

Primary Examiner—Paul R Durand
(74) Attorney, Agent, or Firm—Lerner, David, Littenberg, Krumholz & Mentlik, LLP

(57) ABSTRACT

An apparatus for producing double-walled composite tubes, which have an outer wall with wave peaks and wave valleys and a smooth inner wall, includes two of rows first and second shaping-jaw halves which, along a common shaping section, form a shaping tunnel. The first shaping-jaw halves are located opposite each other in the shaping section and have an inner contour forming a tube socket portion. The second shaping-jaw halves, also located opposite each other, include transverse grooves alternating with transverse fins. A sizing mandrel, which defines narrow vacuum grooves spaced apart from one another in the axial direction on its outer lateral surface, projects into the shaping tunnel and forms the smooth inner wall of the composite tube. A vacuum control valve device provides for defined closure and reopening of the vacuum grooves when positioned in correspondence with the tube socket portion.

7 Claims, 6 Drawing Sheets

APPARATUS FOR PRODUCING DOUBLE-WALLED COMPOSITE TUBES

Figure 1:
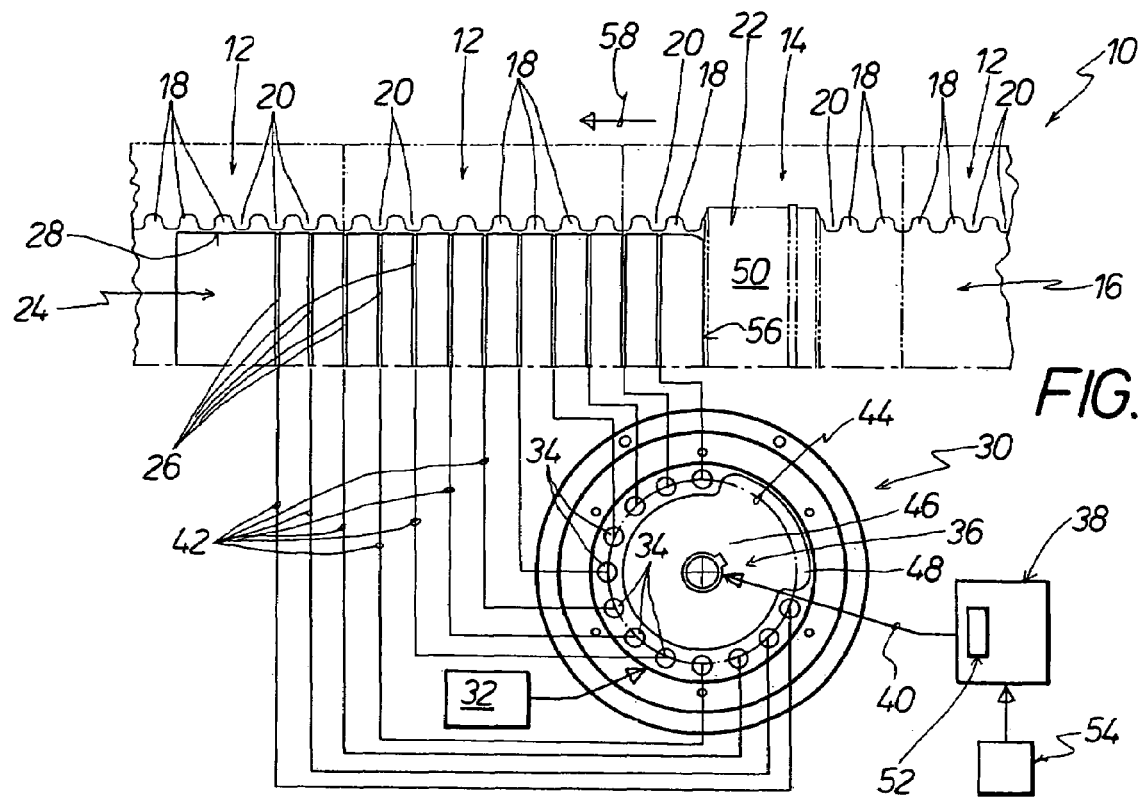

The present application claims priority from German Patent Application No. 102005029580.0 filed Jun. 25, 2005, the disclosure of which is incorporated herein by reference.

The invention relates to an apparatus for producing double-walled composite tubes, having at least one finned tube longitudinal portion with an outer wall which has wave valleys and wave peaks, and a smooth inner wall, which is integrally joined to the wave valleys of the outer wall, and having a tube socket portion, along which the outer wall and the inner wall are integrally joined to one another with surface-to-surface contact, the apparatus having two rows of shaping-jaw halves, which along a common shaping section form a shaping tunnel for production of the composite tube, at least one pair of the shaping-jaw halves lying opposite one another in the shaping section having an inner contour which produces the tube socket portion, while the remaining shaping-jaw halves are alternately designed with transverse grooves corresponding to the wave peaks and transverse fins corresponding to the wave valleys, and a sizing mandrel, to whose outer lateral surface a controlled subatmospheric pressure can be applied, projecting into the shaping tunnel for the smooth inner wall of the composite tube.

An apparatus of this type is known from DE 102 25 582 A1 or from DE 690 12 129 T2. In the apparatus known from DE 102 25 582 A1, the sizing mandrel is designed with at least two regions to which a reduced pressure can be applied, it being possible for each of these reduced-pressure regions to have two feed grooves which are spaced apart from one another in the axial direction and are connected by helically encircling distribution grooves. Therefore, each of these reduced-pressure regions has a defined axial width dimension which is determined by the supply grooves which are spaced apart from one another in the axial direction. Designing the sizing mandrel with the reduced-pressure regions or vacuum zones, which are spaced apart from one another in the axial direction by larger regions without a vacuum and also can only be connected or disconnected in their entirety, means that the vacuum control cannot be sufficiently accurate in the transition region between tube region and socket region. As a result of the inaccurate vacuum control in the transition region, defects tend to form on the inner wall or inner skin.

An apparatus of the type described in the introduction having a sizing mandrel which includes regions to which a reduced pressure can be applied, with each reduced-pressure region being formed by two feed grooves which are spaced apart from one another in the axial direction and distribution grooves which connect these feed grooves, is also known from U.S. Pat. No. 4,808,098.

The invention is based on the object of providing an apparatus of the type described in the introduction, in which the transition regions between the finned tube longitudinal portion and the tube socket portion can be acted on with or without vacuum very accurately.

This object is achieved according to the invention, in an apparatus of the type described in the introduction, by virtue of the fact that the sizing mandrel is designed with narrow vacuum grooves which are spaced apart from one another in the axial direction and run, continuously in the circumferential direction, around the outer lateral surface of the sizing mandrel, and that there is a vacuum control valve device, which has a number of vacuum holes corresponding to the number of vacuum grooves of the sizing mandrel, and a control member which is connected to a drive, each vacuum groove of the sizing mandrel being assigned a vacuum hole of the vacuum control valve device, and the control member being intended to effect defined closure of the vacuum holes, whose vacuum grooves in each case move into the tube socket portion and are located therein, and at the same time to open the vacuum holes which are assigned to the vacuum grooves which are in each case located in the finned tube longitudinal portion.

In the apparatus according to the invention, the vacuum grooves on the outer lateral surface of the sizing mandrel are designed as axially narrow grooves, so that the vacuum source which interacts with the vacuum grooves in a controlled way via the vacuum control device can be of relatively small and energy-saving dimensions.

In the apparatus according to the invention, it is proven expedient for the vacuum grooves to be uniformly spaced apart from one another in the axial direction on the outer lateral surface of the sizing mandrel. The vacuum grooves may be at an axial spacing from one another which corresponds to the axial spacing between adjacent transverse fins of the shaping-jaw halves.

It is advantageous if the vacuum holes of the vacuum control valve device are arranged uniformly spaced apart from one another along a portion of the circumference of a circle, and if the control member of the vacuum control valve device is designed as a control disk with a closure part which, as seen in the circumferential direction of the circle, has a length dimension which is matched to the tube socket portion and complements the portion of the circumference of the circle, along which the vacuum holes are arranged uniformly spaced apart from one another, formed by the vacuum holes to form a complete circle. A design of this type can be realized in a simple and accurate way.

In an apparatus of the type which has just been described, the control disk of the vacuum control valve device can be driven in steps, in each case corresponding to the axial spacing between adjacent vacuum grooves of the sizing mandrel, by means of a piston cylinder unit, forming the drive device, and via a latching disk. The piston-cylinder unit may be formed by a pneumatic cylinder. The pneumatic cylinder is expediently connected to a control pulse device. This control pulse device may be formed by a programmable-memory control unit.

Figure 2:
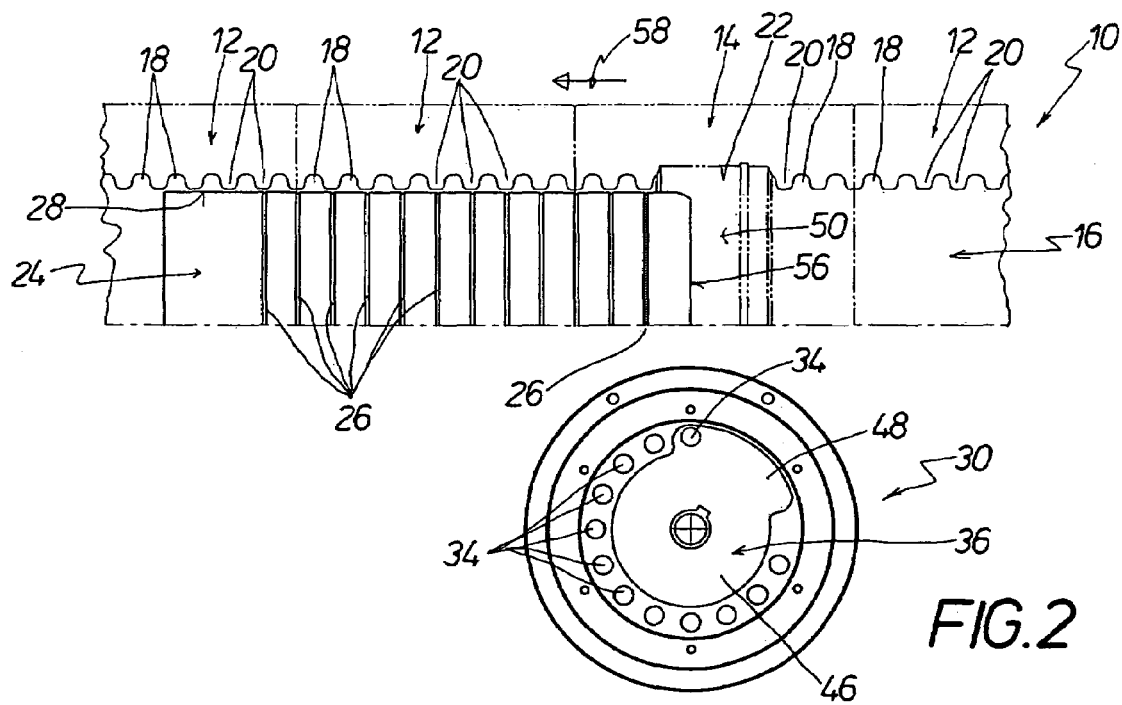
Figure 3:
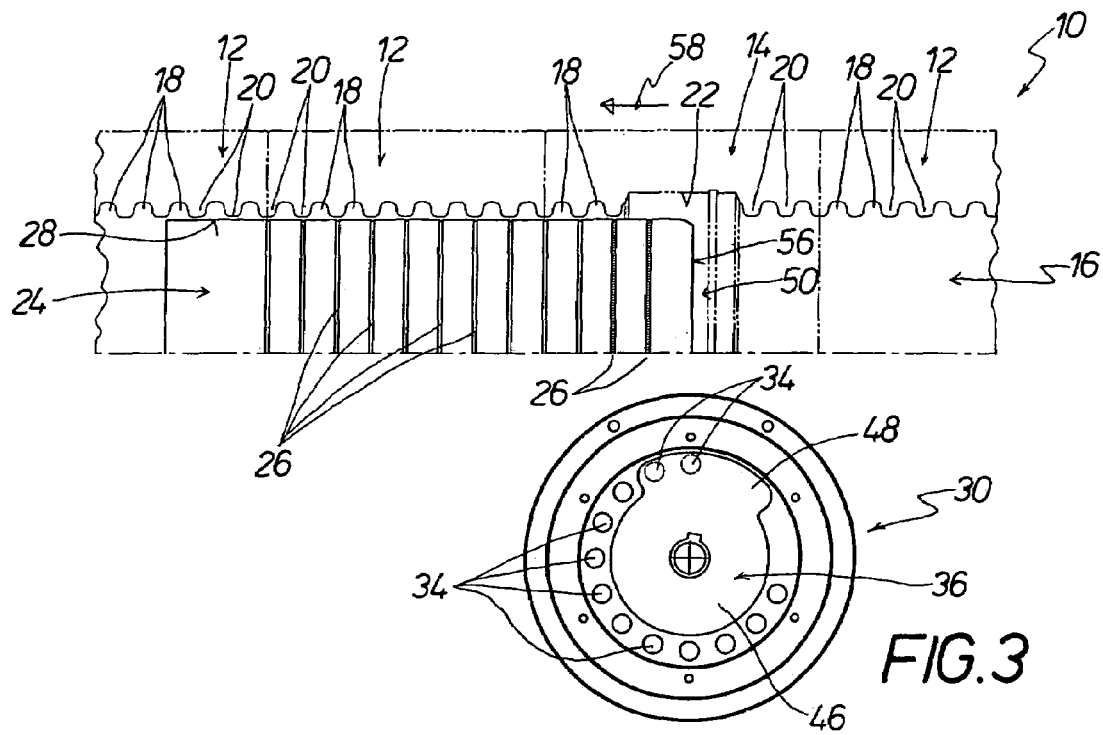
Figure 4:
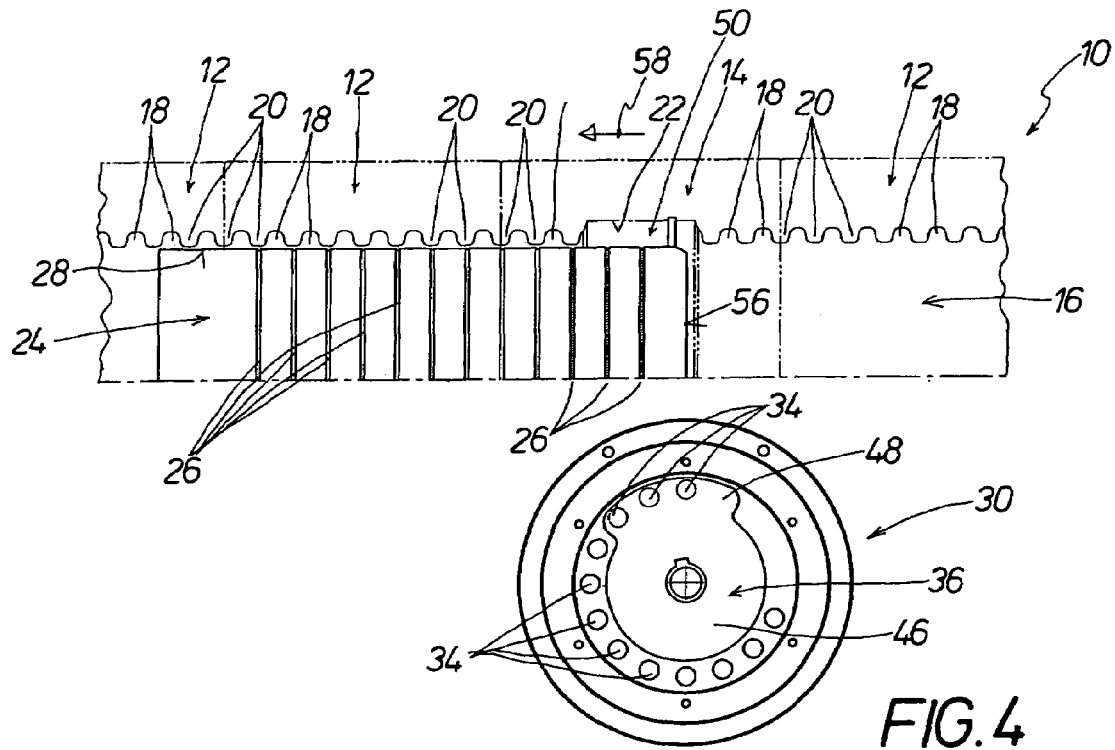
Figure 5:
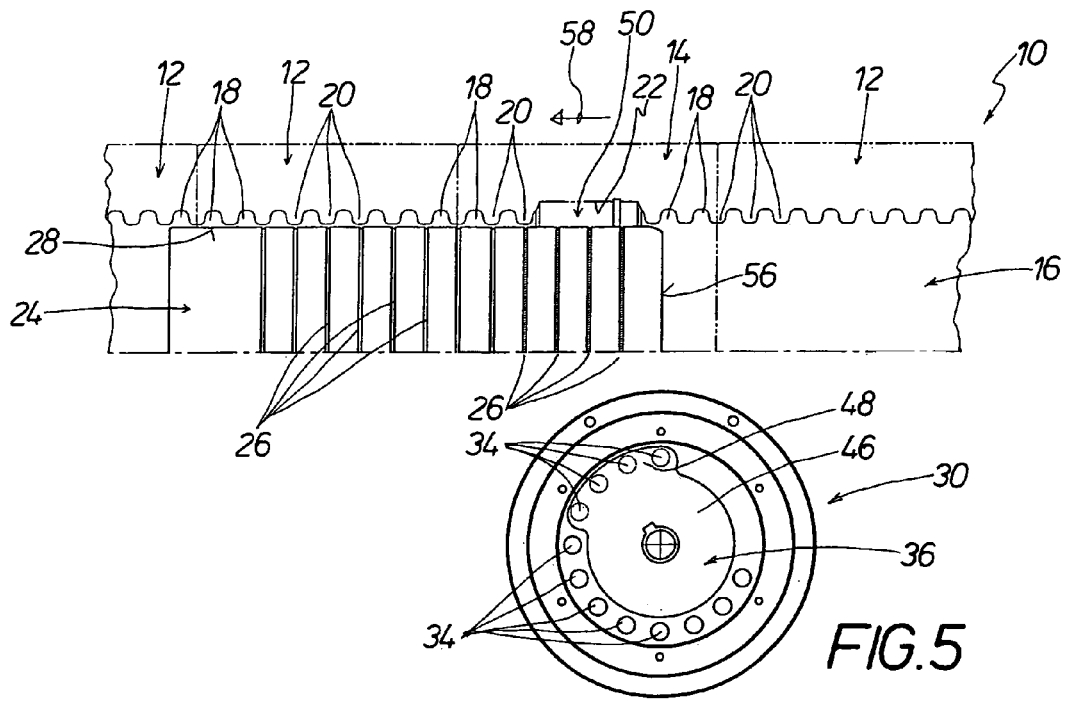
Figure 6:
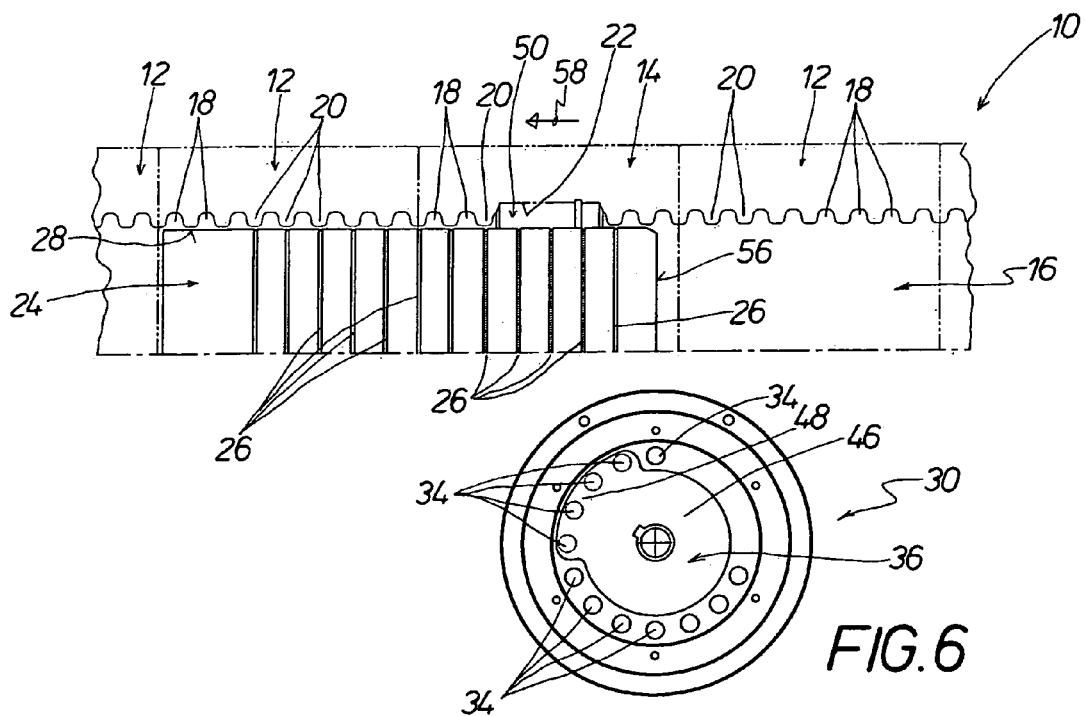
Figure 7:
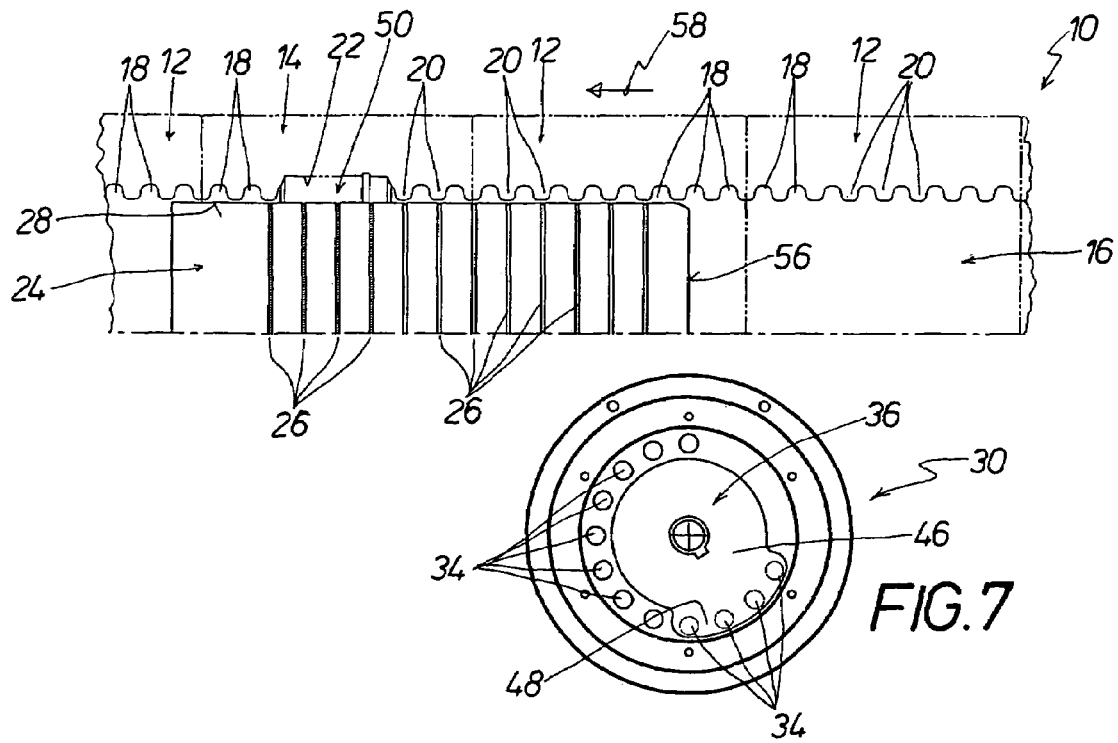
Figure 8:
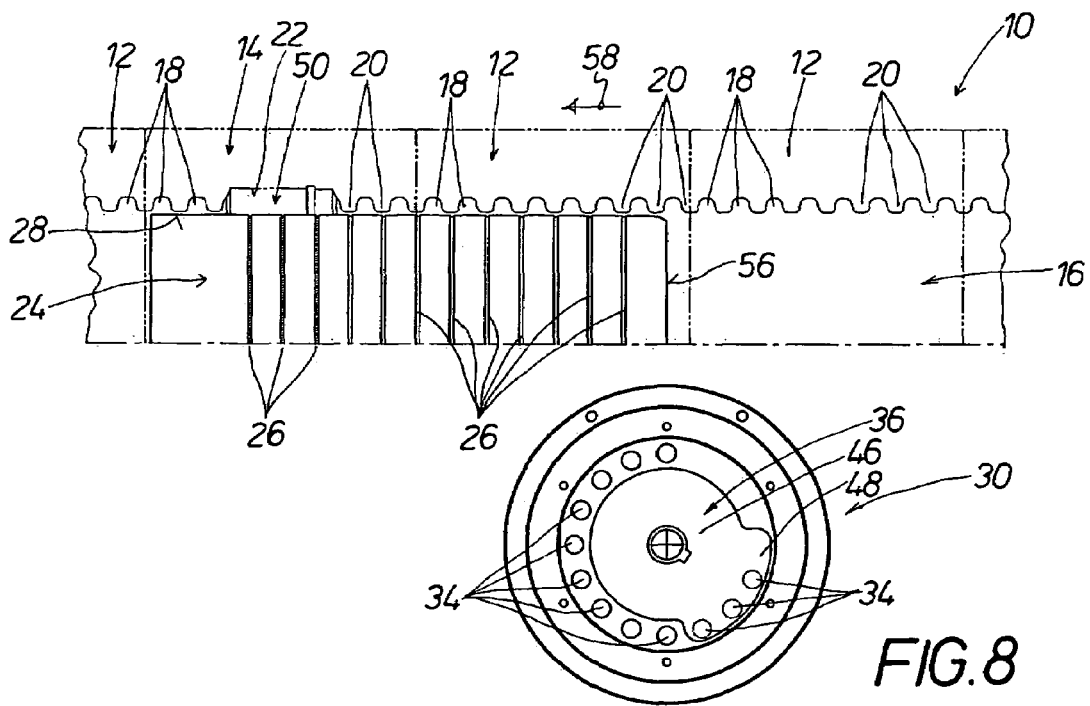
Figure 9:
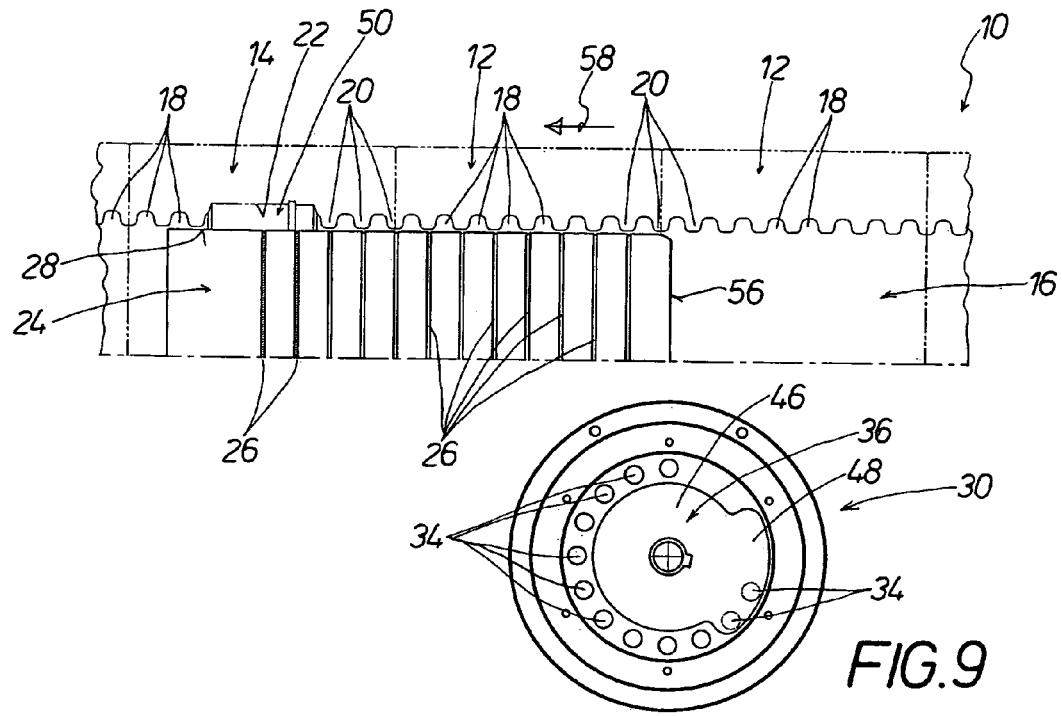
Figure 10:
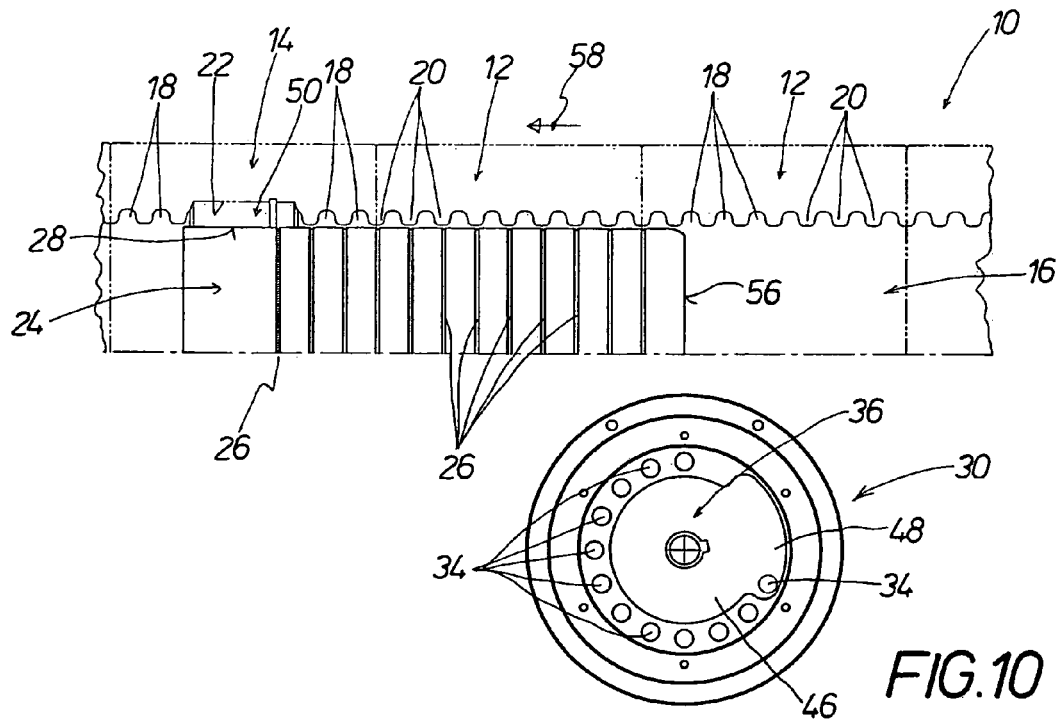
Figure 11:
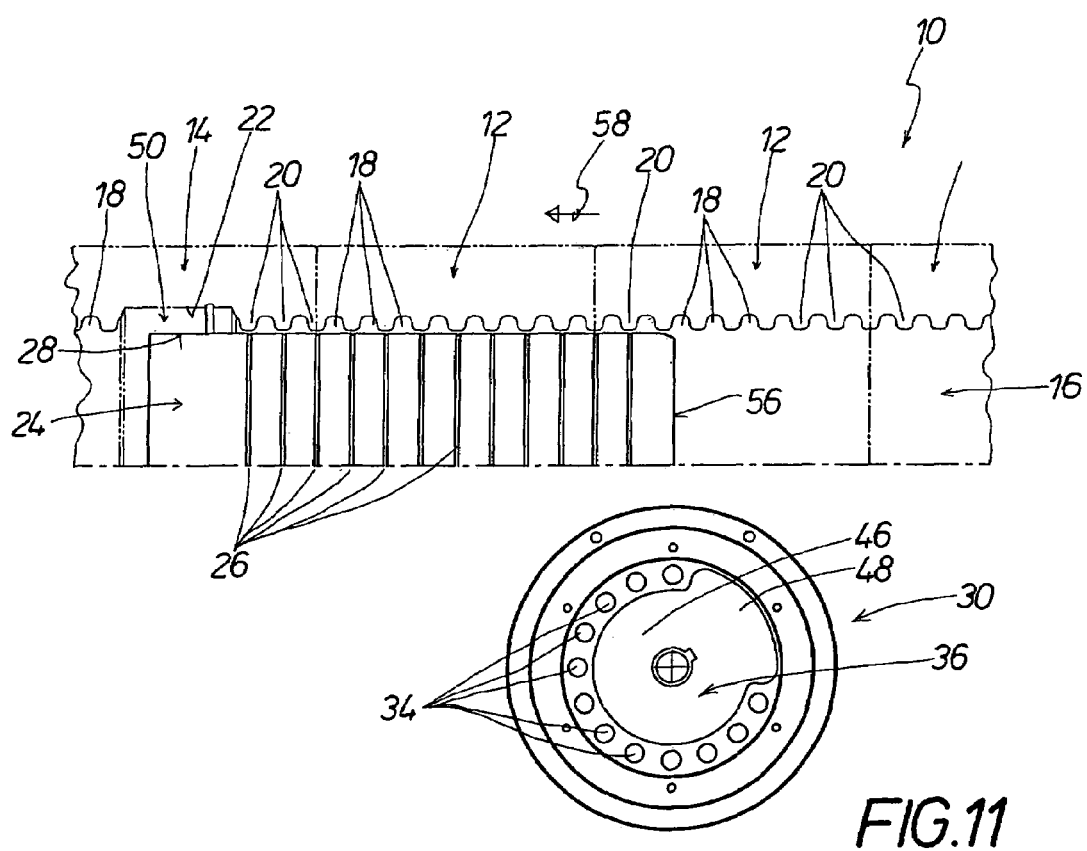

Further details will emerge from the following description of an exemplary embodiment of the apparatus according to the invention, which is diagrammatically illustrated in part in the drawing, and of successive process steps involved in the production of double-walled composite tubes by means of the apparatus according to the invention. In the drawing:

FIG. 1 shows a first operating position of the apparatus,

FIG. 2 shows a second operating position of the apparatus according to the invention, which follows the first operating position shown in FIG. 1, FIG. 3 shows a third operating position of the apparatus according to the invention, which follows the second operating position shown in FIG. 2, FIG. 4 shows a fourth operating position of the apparatus according to the invention, which follows the third operating position shown in FIG. 3, FIG. 5 shows a fifth operating position of the apparatus according to the invention, which follows the fourth operating position shown in FIG. 4, FIG. 6 shows a sixth operating position of the apparatus according to the invention, which follows the fifth operating position shown in FIG. 5, FIG. 7 shows an operating position of the apparatus according to the invention which follows the operating position shown in FIG. 6 and in which the last four vacuum grooves of the sizing mandrel are disconnected from the vacuum source, FIG. 8 shows an operating position of the apparatus according to the invention which follows the operating position shown in FIG. 7 and in which the last three vacuum grooves located in the region of the tube socket portion are disconnected from the vacuum source, FIG. 9 shows an operating position of the apparatus according to the invention which follows the operating position shown in FIG. 8, FIG. 10 shows an operating position of the apparatus according to the invention which follows the operating position shown in FIG. 9 and in which only the last vacuum groove is still in the region of the tube socket portion, and FIG. 11 shows the operating position of the apparatus according to the invention which follows the operating position shown in FIG. 10 and corresponds again to the operating position shown in FIG. 1, since the vacuum grooves of the sizing mandrel are once again assigned to a finned tube longitudinal portion of the double-walled composite tube.

FIG. 1 diagrammatically depicts significant details of the apparatus 10 according to the invention for producing double-walled composite tubes, namely shaping-jaw halves 12 and 14. The drawing illustrates three shaping-jaw halves 12 of a row of shaping jaws. Corresponding shaping-jaw halves 12, 14 lie opposite this row of shaping-jaw halves 12, 14 in a second row (not shown) of shaping-jaw halves, in order to form a shaping tunnel 16 for producing a double-walled composite tube.

The shaping-jaw halves 12 which are positioned opposite one another along the shaping tunnel 16 are alternatively designed with transverse grooves 18 and transverse fins 20.

The shaping-jaw halves 14—of which only one shaping-jaw halve 14 is illustrated in FIG. 1—are designed with an inner contour 22 corresponding to a tube socket portion of the double-walled composite tube that is to be produced. This inner contour 22 is adjoined on both sides by transverse grooves 18 and transverse fins 20.

A sizing mandrel 24 projects into the shaping tunnel 16, only half of which is illustrated. The sizing mandrel 24 is designed with vacuum grooves 26 which run around the outer lateral surface 28 of the sizing mandrel 24. The vacuum grooves 26 each have a small axial width dimension and a low depth. The vacuum grooves 26 are uniformly spaced apart from one another in the axial direction and, via a vacuum control device 30, can be deliberately connected in steps to a vacuum source 32. In FIG. 1, all the vacuum grooves 26 of the sizing mandrel 24 are flow-connected to the vacuum source 32.

The vacuum control valve device 30 has a number of vacuum holes 34 corresponding to the number of vacuum grooves 26 and a control member 36 which is operatively connected to a drive 38. This operative connection is indicated by the arrow 40.

Each vacuum groove 26 of the sizing mandrel 24 is assigned a vacuum hole 34 of the vacuum control valve device 30, which is indicated by the thin lines 42.

The vacuum holes 34 of the vacuum control valve device 30 are uniformly spaced apart from one another along a circle 44, i.e. along a portion of the circumference of the circle 44.

The control member 36 of the vacuum control valve device 30 is designed as control disk 46 with a closure part 48. In the circumferential direction of the circle 44 of the vacuum holes 34, the closure part 48 has a length dimension which corresponds to the tube socket portion 50, defined by the inner contour 22, of the double-walled composite tube which is to be produced by the apparatus 10 according to the invention. The length dimension in the form of a part-circle of the closure part 48 of the control disk 46 complements the circle length portion of the vacuum holes 34 to form a complete circle 44.

The drive device 38 for the control disk 46 forming the control member 36 may be formed by a piston-cylinder unit which is driven in steps, in each case corresponding to the axial spacing between adjacent vacuum grooves 26 of the sizing mandrel 24, by the control disk 46 via a latching disk 52. The piston-cylinder unit of the drive device 38, which is formed, by way of example, by a pneumatic cylinder, is expediently connected to a control pulse device 54, which may be a programmable-memory control unit.

FIG. 1 illustrates an operating position of the apparatus 10 in which the sizing mandrel 24 is assigned to transverse grooves 18 and transverse fins 20 of the shaping-jaw halves 12 and transverse grooves 18 and 20 of the shaping-jaw halves 14, and the end face 56 of the sizing mandrel 24 adjoins the inner contour 22, defining the tube socket portion 50 of a double-walled composite tube (not shown) of the shaping-jaw halves 14.

During the production of double-walled composite tubes, the shaping-jaw halves 12 and 14 move relative to the sizing mandrel 24 in the direction indicated by arrow 58. In this first operating position, all the vacuum grooves 26 of the sizing mandrel 24 are flow-connected to the vacuum source 32 via the vacuum control valve device 30, so that the double-walled composite tube (not shown), which has already been produced by extrusion in a manner known per se, or its smooth inner wall is sucked onto the outer lateral surface 28 of the sizing mandrel 24 in such a manner that it can slide, in order to realize a smooth inner wall of the double-walled composite tube. The outer wall of the double-walled composite tube (not shown) is pushed tightly onto the wavy contour of the shaping-jaw halves 12 produced by the transverse grooves 18 and transverse fins 20 of the shaping-jaw halves 12. This can, for example, be affected in a known way by application of a vacuum to the shaping-jaw halves 12.

FIG. 2 uses a diagrammatic illustration similar to that shown in FIG. 1 to represent a second operating position, which follows the operating position shown in FIG. 1, of the shaping-jaw halves 12 and 14 relative to the sizing mandrel 24 and the corresponding position of the control member 36 of the vacuum control valve device 30. In this position, the closure part 48 of the control member 36 designed as control disk 46 is closing off the vacuum hole 34 which is assigned to the vacuum groove 26 adjacent to the end face 56 of the sizing mandrel 24, so that this first vacuum groove 26 adjacent to the end face 46 is no longer connected to the vacuum source 32 (cf. FIG. 1), but rather the flow connection between the vacuum source 32 and this first vacuum groove 26 is interrupted. In this position of the control member 36 of the vacuum control valve device 30, the remaining vacuum holes 34 are still connected to the associated vacuum grooves 26, so that vacuum can be applied to them from the vacuum source 32.

FIG. 3 shows the third operating state, which follows the operating state shown in FIG. 2 and in which the control member 36 of the vacuum control valve device 30 disconnects the two vacuum grooves 26 which adjoin the end face 56 of the sizing mandrel 24 and are spaced apart from one another in the axial direction from the vacuum source 32 (cf. FIG. 1) since the closure part 48 of the control member 36 is closing off and sealing the vacuum holes 34 associated with the said vacuum grooves 26. The other vacuum holes 34 are open, with the result that the other vacuum grooves 26 are flow-connected to the vacuum source, which is also not shown in FIG. 3.

FIG. 4 illustrates a fourth operating state of the apparatus 10, which follows the operating state shown in FIG. 3 and in which the closure part 48 of the control member 36 is closing off and sealing the first three vacuum holes 34, so that the flow connection between the vacuum source (which is also not shown in FIG. 4) and the three vacuum grooves 26 which adjoin the end face 56 of the sizing mandrel 24 is interrupted. The sizing mandrel 24 in this position projects sufficiently far into the tube socket portion 50 defined by the inner contour 22 for the third vacuum groove 26, starting from the end face 56, is assigned to the transverse fin 20 of the respective shaping-jaw half 14 which adjoins the tube socket portion 50 in the downstream direction, as seen in the direction of advance of the shaping-jaw halves 12 and 14 indicated by the arrow 58.

FIG. 5 illustrates a fifth operating state of the apparatus 10, which follows the operating state shown in FIG. 4 and in which the closure part 48 of the control member 36 is closing off and sealing the first four vacuum holes 34, so that the flow connection between the vacuum source 32 (cf. FIG. 1) and the first four vacuum grooves 26, which adjoin the end face 56 of the sizing mandrel 24, is interrupted. In this operating state, the end face 56 of the sizing mandrel 24 has already moved beyond the tube socket portion 50 in the upstream direction, as seen in the direction of advance of the shaping-jaw halves 12 and 14 indicated by the arrow 58, so that a reduced pressure in the tube socket portion 50 is avoided.

FIG. 6 shows a sixth operating state, which follows the operating state shown in FIG. 5 and in which the control member 36 of the vacuum control valve device 30 likewise closes off and seals four vacuum holes 34, although the first vacuum hole 34 has already been opened again, so that the first vacuum hole 34 and the sixth vacuum hole 34 and the following vacuum holes 34 are flow-connected to the vacuum source 32 (cf. FIG. 1). However, this means that the first vacuum groove 26 adjacent to the end face 56 and the sixth and following vacuum grooves 26 are flow-connected to the vacuum source (which is also not illustrated in FIG. 6) and that the flow connection between the second, third, fourth and fifth vacuum grooves 26 and the vacuum source is interrupted. The latter vacuum grooves 26 are the vacuum grooves which, in this operating state, are located in the region of the tube socket portion 50 of the two diametrically opposite shaping-jaw halves 14; in FIG. 6, likewise only one shaping-jaw half 14 is illustrated in the drawing.

The shaping-jaw halves 12 and 14 are moving continuously in the direction of advance indicated by arrow 58, with the sizing mandrel 24 provided in a stationary position with respect thereto, while at the same time the vacuum control device 30, i.e. its control member 36, is driven in steps in order to close and seal or keep open or reopen the corresponding vacuum holes 34.

FIG. 7 illustrates an operating state of the apparatus 10 in which the last four vacuum grooves 26, furthest away from the end face 56 of the sizing mandrel 24, are not flow-connected to the vacuum source 32 (cf. FIG. 1), since the closure part 48 of the control member 36, designed as a control disk 46, is closing and sealing the last four vacuum holes 34. The other, front vacuum grooves 26 are flow-connected to the vacuum source via the corresponding vacuum holes 34.

FIG. 8 illustrates an operating state which follows the operating state in FIG. 7 and in which the control member 36 of the vacuum control valve device 30 is closing off and sealing the last three vacuum holes 34, so that the associated last three vacuum grooves 26 of the sizing mandrel 24 are sealed off with respect to the vacuum source. The other vacuum grooves 26 in front of these last three sealed-off vacuum grooves 26 are flow-connected to the vacuum source 32 (cf. FIG. 1).

FIG. 9 illustrates the operating state which follows the operating state shown in FIG. 8 and in which the last two vacuum grooves 26 of the sizing mandrel 24 are sealed off by means of the vacuum control device 30, and FIG. 10 illustrates the operating state which follows the operating state shown in FIG. 9 and in which only the last vacuum groove 26 of the sizing mandrel 24 is still not flow-connected to the vacuum source 32 (cf. FIG. 1).

The operating states shown in FIGS. 8, 9 and 10 are operating states in which the shaping-jaw halves 12 and 14 are in positions with respect to the sizing mandrel 24 in which the tube socket portion 50 of the shaping-Jaw halves 14 located opposite one another is moving past the vacuum grooves 26 which have in each case been blocked off.

FIG. 11 finally illustrates the operating state of the apparatus 10 in which the vacuum grooves 26 of the sizing mandrel 24 are again assigned only to transverse fins 20 and transverse grooves 18 which alternate with the latter. This operating position shown in FIG. 11 therefore once again corresponds to the operating position shown in FIG. 1, in which the control member 36 of the vacuum control valve device 30 remains in the position shown in FIG. 11 for as long as only shaping-jaw halves 12 with transverse grooves 18 and transverse fins 20 are moving passed the sizing mandrel 24. Only when shaping-jaw halves 14 which are designed with an inner contour 22 which forms a tube socket portion 50 once again reach an operating position shown in FIG. 1 is the vacuum control valve device 30 activated again in order then for the vacuum holes 34, and with the aid of the latter the respectively associated vacuum grooves 26 to be closed and sealed in steps by means of the control member 36, i.e. for the flow connection between the vacuum source 32 and the corresponding vacuum grooves 26 to be interrupted.

What is claimed is:

1. An apparatus for producing a double-walled composite tube, wherein the tube has least one finned tube longitudinal portion with an outer wall having wave valleys and wave peaks, smooth inner wall integrally joined to the wave valleys of the outer wall, and at least one tube socket portion along which the outer wall and the inner wall are integrally joined to each other, the apparatus comprising;

two rows of first and second shaping-jaw halves forming, along a common shaping section, a shaping tunnel, wherein the first shaping-jaw halves of the two rows lie opposite each other in the shaping section and have an inner contour for producing a tube socket portion, wherein the second shaping-jaw halves of the two rows lie opposite each other and include transverse grooves alternating with transverse fins for producing, respectively, the wave peaks and the wave valleys of the finned tube longitudinal portion;

a sizing mandrel having an outer lateral surface adapted for application of a controlled subatmospheric pressure and projecting into the shaping tunnel for forming the smooth inner wall of the composite tube, wherein the sizing mandrel defines a plurality of narrow vacuum grooves spaced apart from one another in the axial direction and extending, continuously in the circumferential direction around the outer lateral surface;

a vacuum control valve device defining a plurality of vacuum holes respectively corresponding to the plurality of vacuum grooves of the sizing mandrel; and a control member connected to a drive device and operable for closing the vacuum holes corresponding to the vacuum grooves located at the tube socket portion and simultaneously opening the vacuum holes corresponding to the vacuum grooves located at the finned tube longitudinal portion.

2. The apparatus as claimed in claim 1, wherein the vacuum grooves are uniformly spaced apart from one another in the axial direction on the outer lateral surface of the sizing mandrel.

3. The apparatus as claimed in claim 1, wherein the vacuum holes of the vacuum control valve device are uniformly spaced apart from one another along a portion of the circumference of a circle, and wherein the control member of the vacuum control valve device is a control disk with a closure part having a first circumferential dimension matched to the tube socket portion and a second circumferential dimension matched to the tube longitudinal portion.

4. The apparatus as claimed, in claim 3, wherein the control disk of the vacuum control valve device is drivable in a plurality of piston-cylinder unit forming the drive device and via a latching disk, wherein each of the steps corresponds to an axial spacing between adjacent ones of the vacuum grooves of the sizing mandrel.

5. The apparatus as claimed in claim 4, wherein the piston-cylinder unit is formed by a pneumatic cylinder.

6. The apparatus as claimed in claim 4, wherein the piston-cylinder unit is connected to a control pulse device.

7. The apparatus as claimed in claim 6, wherein the control pulse device is a programmable-memory control unit.

* * * * *

UNITED STATES PATENT AND TRADEMARK OFFICE
CERTIFICATE OF CORRECTION

PATENT NO. : 7,452,319 B2
APPLICATION NO. : 11/426142
DATED : November 18, 2008
INVENTOR(S) : Gerhard Neubeuer It is certified that error appears in the above-identified patent and that said Letters Patent is hereby corrected as shown below:

Column 6, line 16, "shaping-Jaw" should read -- shaping-jaw --.
Column 6, line 43, "peaks, smooth" should read -- peaks, a smooth --.
Column 8, line 3, "claimed, in claim 3" should read -- claimed in claim 3 --.
Column 8, line 5, "of piston-cylinder" should read -- of steps by a piston-cylinder --.

Signed and Sealed this

Eighteenth Day of May, 2010

David J. Kappos
*Director of the United States Patent and Trademark Office*